United States Patent
Chen

(10) Patent No.: US 9,433,000 B2
(45) Date of Patent: Aug. 30, 2016

(54) SINGLE-CARD DUAL-STANDBY TERMINAL AND DATA SERVICE CONNECTING METHOD

(71) Applicant: Huawei Device Co., Ltd., Shenzhen (CN)

(72) Inventor: Guoqiao Chen, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 201 days.

(21) Appl. No.: 14/171,090

(22) Filed: Feb. 3, 2014

(65) Prior Publication Data

US 2014/0146781 A1    May 29, 2014

Related U.S. Application Data

(63) Continuation of application No. PCT/CN2012/077523, filed on Jun. 26, 2012.

(30) Foreign Application Priority Data

Aug. 3, 2011    (CN) .......................... 2011 1 0221315

(51) Int. Cl.
*H04W 88/06*    (2009.01)
*H04W 72/04*    (2009.01)
*H04W 48/18*    (2009.01)

(52) U.S. Cl.
CPC .......... *H04W 72/0486* (2013.01); *H04W 48/18* (2013.01); *H04W 88/06* (2013.01); *Y02B 60/50* (2013.01)

(58) Field of Classification Search
CPC ........... H04W 48/18; H04W 72/0486; H04W 88/06; Y02B 60/50

USPC .................................................. 370/329, 338
See application file for complete search history.

(56) References Cited

U.S. PATENT DOCUMENTS

2003/0218995 A1    11/2003  Kim et al.
2007/0171893 A1    7/2007  Xu et al.
(Continued)

FOREIGN PATENT DOCUMENTS

CN    101765186 A    6/2010
CN    101977417 A    2/2011
(Continued)

OTHER PUBLICATIONS

CN102137459A—English Translation.*
(Continued)

*Primary Examiner* — Peter Cheng
*Assistant Examiner* — Natali N Pascual Peguero
(74) *Attorney, Agent, or Firm* — Conley Rose, P.C.; Grant Rodolph; Nicholas K. Beaulieu

(57) ABSTRACT

The present invention relates to processing that a single-card dual-standby terminal establishes a packet switch (PS) connection. In embodiments of the present invention, a single-card dual-standby terminal initiates a data service connection request through a currently used access network, and a packet switch core network performs processing on the data service connection request of the terminal according to a network resource and a data service requested by the terminal, so that a PS connection bearer of the single-card dual-standby terminal is established on a proper network, thereby fully utilizing an existing network resource and reducing electric energy consumption of a single-card dual-standby terminal.

10 Claims, 3 Drawing Sheets

(56) References Cited

U.S. PATENT DOCUMENTS

2007/0275742 A1\* 11/2007 Zhang .................. H04L 12/189
455/466
2013/0235847 A1 9/2013 Li et al.

FOREIGN PATENT DOCUMENTS

| CN | 102137459 A | 7/2011 |
|---|---|---|
| EP | 1895799 A1 | 3/2008 |
| EP | 2621216 A1 | 7/2011 |
| EP | 2384061 A2 | 11/2011 |
| WO | 2011043710 A1 | 4/2011 |

OTHER PUBLICATIONS

Foreign Communication From A Counterpart Application, PCT Application No. PCT/CN2012/077523, English Translation of International Search Report dated Oct. 4, 2012, 2 pages.
Foreign Communication From A Counterpart Application, PCT Application No. PCT/CN2012/077523, English Translation of Written Opinion dated Oct. 4, 2012, 6 pages.
Foreign Communication From A Counterpart Application, European Application No. 12767973.6, Extended European Search Report dated Jul. 2, 2014, 12 pages.
Partial English Translation and Abstract of Chinese Patent Application No. CN102137459A, Mar. 20, 2014, 13 pages.

\* cited by examiner

SINGLE-CARD DUAL-STANDBY TERMINAL AND DATA SERVICE CONNECTING METHOD

CROSS-REFERENCE TO RELATED APPLICATIONS

This application is a continuation of International Application No. PCT/CN2012/077523, filed on Jun. 26, 2012 which claims priority to Chinese Patent Application No. 201110221315.5, filed on Aug. 3, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular to a single-card dual-standby terminal and a data service connecting method.

BACKGROUND

A single-card dual-standby terminal is a terminal having a capability of using one subscriber identity module (SIM) card to simultaneously access two different access networks. This kind of terminal has two different radio access antennas and can enable different radio frequencies in a same operating system to simultaneously access different networks by using different access technologies, for example, simultaneously access a global system of mobile communication (GSM) network and a time division-synchronous code division multiple access (TD-SCDMA) network. Emergence of a single-card dual-standby terminal is mainly to solve a problem: during a process that a same operator deploys two kinds of access networks, because different access networks have different coverage and performance, a ping-pong handover among different networks may occur in a process that a terminal initiates a circuit switched (CS) call, or even a service may not be connected. A single-card dual-standby terminal may camp on two networks at the same time, so that two CS access channels and two packet switch (PS) access channels exist. The terminal may select a CS channel of a GSM network as a default channel for voice and a PS channel of a TD-SCDMA network as a default channel for data. For a single-card dual-standby terminal in GSM and TD-SCDMA networks, after simultaneously accessing a GSM access network and a TD access network, a voice call uses a CS resource of the GSM and a data service uses a PS resource of the TD-SCDMA. A PS network capability of the GSM network is wasted in a process of using the single-card dual-standby terminal, thereby causing repeated network construction. Because the GSM network is responsible for a voice call service, the terminal camps on a CS network for a long time, and a radio frequency of the GSM must be always enabled. While, the TD-SCDMA network is responsible for a PS service connection, and in many cases, it is unnecessary that PS is always online, so that when there is no PS connection, enabling a radio frequency of a TD-SCDMA network according to a single-card dual-standby principle causes waste of a resource and electric energy.

SUMMARY

Embodiments of the present invention mainly aim at providing a data service connection establishing method for a single-card dual-standby terminal, so as to solve a problem in the prior art that waste of a resource and electric energy is caused by enabling a radio frequency of a TD-SCDMA network when a single-card dual-standby terminal has no PS connection.

In order to solve the foregoing problem, in one aspect, an embodiment of the present invention provides a data service connection establishing method for a single-card dual-standby terminal, where the method includes: initiating a data service connection request through a first network; establishing a data service connection bearer on the first network when a data service bearing capability of the general packet radio service (GPRS) of the first network can bear the data service connection request; and establishing the data service connection bearer on a second network when the data service bearing capability of the GPRS of the first network cannot bear the data service connection request.

In another aspect, a single-card dual-standby terminal is provided, where the single-card dual-standby terminal includes: a sending module, where the sending module is configured to initiate a data service connection request through a first network; and a data service connection bearer establishing module, where the data service connection bearer establishing module is configured to establish a data service connection bearer on the first network when a data service bearing capability of the GPRS of the first network can bear the data service connection request; and establish the data service connection bearer on a second network when the data service bearing capability of the GPRS of the first network cannot bear the data service connection request.

In another aspect, a data service connection establishing method for a single-card dual-standby terminal is provided, where the method includes: receiving a data service connection request that is initiated by a single-card dual-standby terminal through a first network; determining whether a data service bearing capability of the GPRS of the first network can bear the data service connection request; and processing the data service connection request according to the determining result.

In another aspect, a packet switch core network is provided, where the packet switch core network includes: a receiving module, where the receiving module is configured to receive a data service connection request that is initiated by a single-card dual-standby terminal through a first network; a determining module, where the determining module is configured to determine whether a data service bearing capability of the GPRS of the first network can bear the data service connection request; and a processing module, where the processing module is configured to process the data service connection request according to the determining result.

It can be seen from the foregoing technical solutions that, in the embodiments of the present invention, a PS connection bearer of a single-card dual-standby terminal is established on a proper network through network control, thereby fully utilizing an existing network resource and reducing electric energy consumption of a single-card dual-standby terminal.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The embodiments to be described are merely a part rather than all of the embodiments of the present invention. All other embodiments obtained by persons of ordinary skill in the art based on the embodiments of the present invention without creative efforts shall fall within the protection scope of the present invention.

The embodiments of the present invention may be described by taking a single-card dual-standby terminal capable of simultaneously accessing a GSM network and a TD-SCDMA network as an example.

Figure 1:
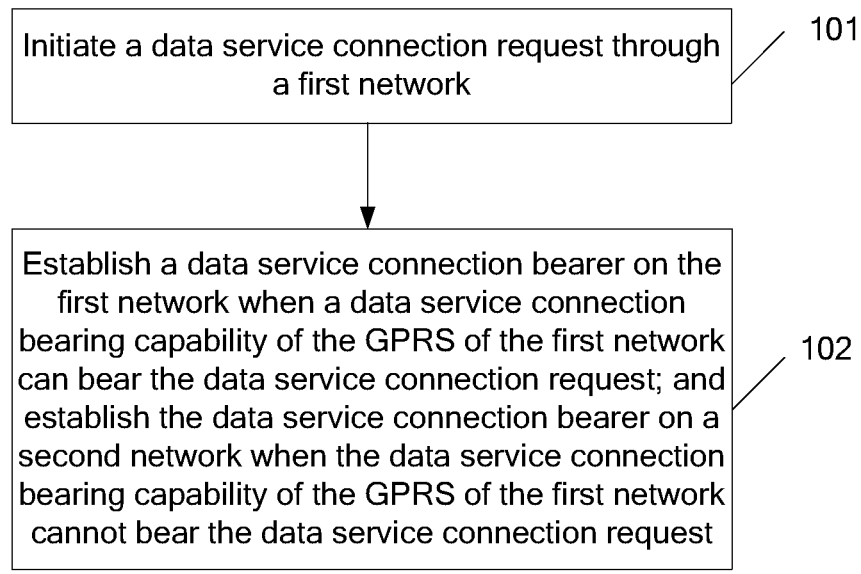
FIG. 1 is a schematic diagram of a first method embodiment of the present invention.

FIG. 1 is a schematic diagram of a first method embodiment of the present invention.

101: Initiate a data service connection request through a first network.

The first network refers to an access network that is used by a terminal currently. For example, when a single-card dual-standby terminal camps on a GSM network, and PS connection needs to be established, a PS connection establishment request is initiated to the network by using a GPRS access point of the GSM network. Meanwhile, the PS connection establishment request carries a type identifier of the single-card dual-standby terminal, which indicates that the terminal belongs to a single-card dual-standby terminal.

102: Establish a data service connection bearer on the first network when a data service bearing capability of the GPRS of the first network can bear the data service connection request; and establish the data service connection bearer on a second network when the data service bearing capability of the GPRS of the first network cannot bear the data service connection request.

In a process that a single-card dual-standby terminal establishes a network connection by using the GPRS, a packet switch core network, such as a serving GPRS support node (SGSN)/mobility management entity (MME), performs the following determination: determining whether a current GPRS network connection capability is sufficient and whether a resource is sufficient, that is, determining whether a current load situation of a GPRS network can support the data service connection request and determining whether a type of a PS service requested by the single-card dual-standby terminal is supported by the GPRS network. When the current GPRS network connection capability is sufficient, the resource is sufficient, and the type of the PS service requested by the single-card dual-standby terminal is supported by the GPRS network, the PS connection bearer is established on the GPRS of the GSM network. Because the single-card dual-standby terminal carries a type identifier of the single-card dual-standby terminal in the network connection establishment request, when the current GPRS network connection capability is insufficient and the resource is insufficient, the single-card dual-standby terminal is instructed to enable a radio frequency of a TD network and the PS connection bearer is established on the radio frequency of the TD. After completing a PS connection bearer establishment process on the TD, the single-card dual-standby terminal starts a PS connection bearer release process on the GPRS to release the PS connection bearer established on the GPRS.

When the PS connection bearer of the single-card dual-standby terminal is on the radio frequency of the TD, and the packet switch core network, such as the SGSN/MME, determines that the current GPRS network connection capability is sufficient, the resource is sufficient, and the type of the PS service requested by the single-card dual-standby terminal is supported by the GPRS network, a modification procedure is started to modify the PS connection bearer to the GPRS of the GSM.

Figure 2:
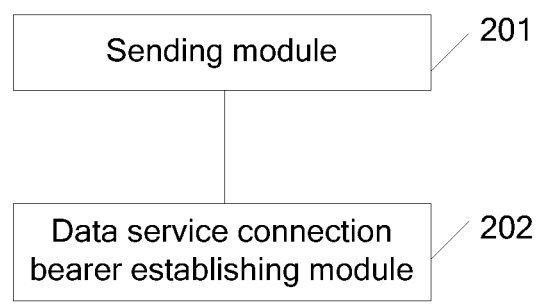
FIG. 2 is a schematic diagram of a first terminal embodiment of the present invention.

FIG. 2 is a schematic diagram of a first terminal embodiment of the present invention.

A single-card dual-standby terminal according to this embodiment of the present invention includes a sending module 201 and a data service connection bearer establishing module 202, where the sending module 201 is configured to initiate a data service connection request through a first network; and the data service connection bearer establishing module 202 is configured to establish a data service connection bearer on the first network when a data service bearing capability of the GPRS of the first network can bear the data service connection request; and establish the data service connection bearer on a second network when the data service bearing capability of the GPRS of the first network cannot bear the data service connection request.

Figure 3:
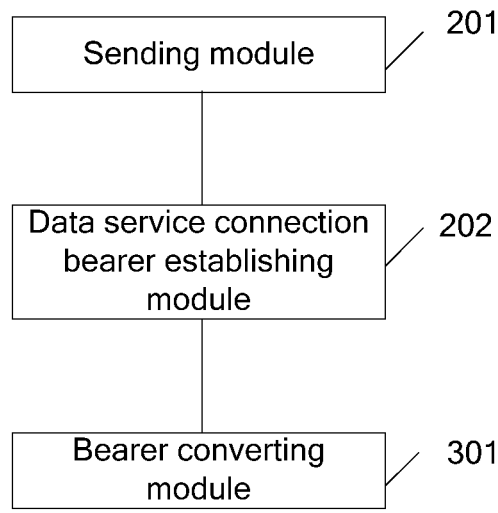
FIG. 3 is a schematic diagram of a second terminal embodiment of the present invention.

FIG. 3 is a schematic diagram of a second terminal embodiment of the present invention. A single-card dual-standby terminal according to this embodiment of the present invention further includes, in addition to the modules described in the first terminal embodiment, a bearer converting module 301, where bearer converting module 301 is configured to, after the data service connection bearer is established on the second network, establish the data service connection bearer on the first network when a message indicating that the data service bearing capability of the GPRS of the first network can bear the data service connection request is received; or after the data service connection bearer is established on the first network, establish the data service connection bearer on the second network when a message indicating that the data service bearing capability of the GPRS of the first network cannot bear the data service connection request is received.

Figure 4:
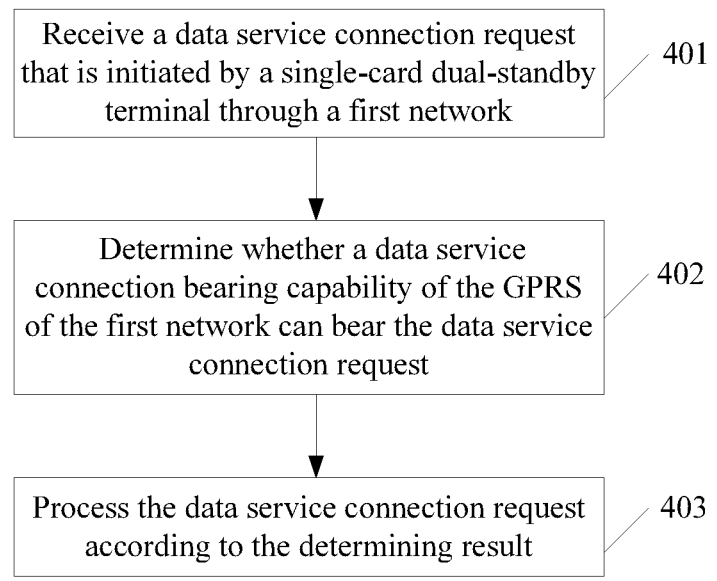
FIG. 4 is a schematic diagram of a second method embodiment of the present invention.

FIG. 4 is a schematic diagram of a second method embodiment of the present invention.

401: Receive a data service connection request that is initiated by a single-card dual-standby terminal through a first network.

The first network refers to an access network that is used by a terminal currently. For example, when a single-card dual-standby terminal camps on a GSM network, and a PS connection needs to be established, a PS connection establishment request is initiated to the network by using a GPRS access point of the GSM network. Meanwhile, a network connection establishment request carries a type identifier of the single-card dual-standby terminal, which indicates that the terminal belongs to a single-card dual-standby terminal.

402: Determine whether a data service bearing capability of the GPRS of the first network can bear the data service connection request.

Determine whether a current GPRS network connection capability is sufficient and whether a resource is sufficient, that is, determine whether a current load situation of a GPRS network can support the data service connection request and whether a type of a PS service requested by the single-card dual-standby terminal is supported by the GPRS network.

403: Process the data service connection request according to the determining result.

When the current GPRS network connection capability is sufficient, the resource is sufficient, and the type of the PS service requested by the single-card dual-standby terminal is supported by the GPRS network, the PS connection bearer is established on the GPRS of the GSM network. Because the single-card dual-standby terminal carries a type identifier of the single-card dual-standby terminal in the network connection establishment request, when the current GPRS network connection capability is insufficient and the resource is insufficient, the single-card dual-standby terminal is instructed to enable a radio frequency of a TD network and the PS connection bearer is established on the radio frequency of the TD. After completing a PS connection bearer establishment process on the TD, the single-card dual-standby terminal starts a PS connection bearer release process on the GPRS to release the PS connection bearer established on the GPRS.

When the PS connection bearer of the single-card dual-standby terminal is on the radio frequency of the TD, if it is determined that the current GPRS network connection capability is sufficient, the resource is sufficient, and the type of the PS service requested by the single-card dual-standby terminal is supported by the GPRS network, a modification procedure is started to modify the PS connection bearer to the GPRS of the GSM.

Figure 5:
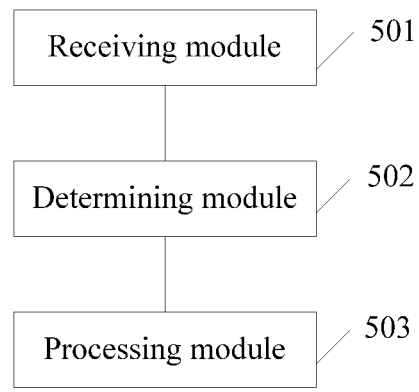
FIG. 5 is a schematic diagram of a first packet switch core network embodiment of the present invention.

FIG. 5 is a schematic diagram of a first packet switch core network embodiment of the present invention.

A packet switch core network according to this embodiment of the present invention includes a receiving module 501, a determining module 502, and a processing module 503, where the receiving module 501 is configured to receive a data service connection request that is initiated by a single-card dual-standby terminal through a first network; the determining module 502 is configured to determine whether a data service bearing capability of the GPRS of the first network can bear the data service connection request; and the processing module 503 is configured to process the data service connection request according to the determining result.

Figure 6:
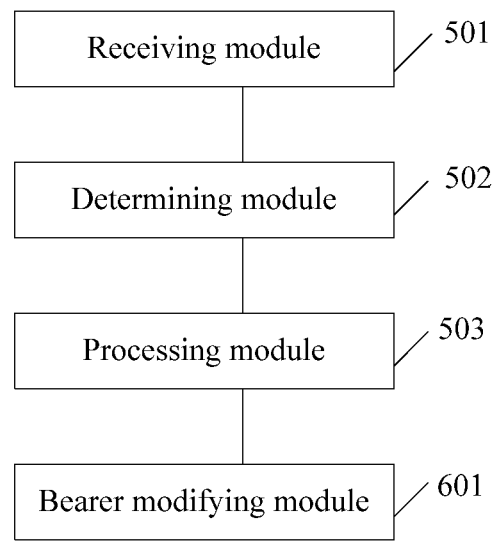
FIG. 6 is a schematic diagram of a second packet switch core network embodiment of the present invention.

FIG. 6 is a schematic diagram of a second packet switch core network embodiment of the present invention. A packet switch core network according to this embodiment of the present invention further includes, in addition to the modules described in the first packet switch core network embodiment, a bearer modifying module 601, where the bearer modifying module 601 is configured to, after a data service connection bearer is established on a second network, establish the data service connection bearer on the first network when it is determined that the data service bearing capability of the GPRS of the first network can bear the data service connection request; or after the data service connection bearer is established on the first network, establish the data service connection bearer on the second network when a message indicating that the data service bearing capability of the GPRS of the first network cannot bear the data service connection request is received.

It can be seen from the foregoing embodiments that, in the embodiments of the present invention, a terminal initiates a data service connection request through a currently used access network, and a packet switch core network performs processing on the data service connection request of the terminal according to a network resource and a data service requested by the terminal, so that a PS connection bearer of a single-card dual-standby terminal is established on a proper network, thereby fully utilizing an existing network resource and reducing electric energy consumption of a single-card dual-standby terminal.

Finally, it should be noted that the foregoing embodiments are merely exemplary embodiments of the present invention rather than limiting the present invention. Although the embodiments of the present invention are described in detail with reference to the foregoing embodiments, persons of ordinary skill in the art should understand that they may still make modifications to the technical solutions described in the foregoing embodiments or make equivalent replacements to some technical features thereof; however, these modifications or replacements do not make the essence of corresponding technical solutions depart from the spirit and scope of the technical solutions in the embodiments of the present invention.

What is claimed is:

1. A data service connection establishing method for a single-card dual-standby terminal, comprising:
    initiating a data service connection request through a first network;
    receiving a response to the data service connection request through the first network;
    establishing a data service connection bearer on the first network when the response to the data service connection request indicates that a data service bearing capability of a general packet radio service (GPRS) of the first network can bear the data service connection request;
    enabling a radio frequency of a second network on the single-card dual-standby terminal when the response to the data service connection request indicates that the data service bearing capability of the GPRS of the first network cannot bear the data service connection request;
    establishing the data service connection bearer on the second network when the response to the data service connection request indicates that the data service bearing capability of the GPRS of the first network cannot bear the data service connection request; and
    switching the data service connection bearer from the second network back to the first network when a message is received indicating that the data service bearing capability of the GPRS of the first network can bear the data service connection request.

2. The method according to claim 1, wherein that the data service bearing capability of the GPRS of the first network can bear the data service connection request comprises:
- a type of a data service connection requested by the data service connection request can be supported by the GPRS of the first network; and
- a load situation of the GPRS of the first network can support the data service connection request.

3. The method according to claim 1, wherein the first network is a global system of mobile communication (GSM) network, and the second network is a time division-synchronous code division multiple access (TD-SCDMA) network.

4. A single-card dual-standby terminal, comprising:
- a non-transitory computer-readable medium having instructions stored thereon; and
- a computer hardware processor coupled to the non-transitory computer-readable medium and configured to execute the instructions to:
  - initiate a data service connection request through a first network;
  - receive a response to the data service connection request through the first network;
  - establish a data service connection bearer on the first network when the response to the data service connection request indicates that a data service bearing capability of the general packet radio service (GPRS) of the first network can bear the data service connection request;
  - enable a radio frequency of a second network on the single-card dual-standby terminal when the response to the data service connection request indicates that the data service bearing capability of the GPRS of the first network cannot bear the data service connection request;
  - establish the data service connection bearer on the second network when the response to the data service connection request indicates that the data service bearing capability of the GPRS of the first network cannot bear the data service connection request; and
  - switch the data service connection bearer from the second network back to the first network when a message is received indicating that the data service bearing capability of the GPRS of the first network can bear the data service connection request.

5. A data service connection establishing method for a single-card dual-standby terminal, comprising:
- receiving a data service connection request that is initiated by a single-card dual-standby terminal through a first network;
- determining whether a data service bearing capability of the general packet radio service (GPRS) of the first network can bear the data service connection request;
- processing the data service connection request according to the determining result;
- instructing the single-card dual-standby terminal to enable a second network and establishing the data service connection bearer on the second network when it is determined that the data service bearing, capability of the GPRS of the first network cannot bear the data service connection request; and
- switching the data service connection bearer from the second network back to the first network when a message is received indicating that the data service bearing capability of the GPRS of the first network can bear the data service connection request.

6. The method according to claim 5, wherein processing the data service connection request according to the determining result comprises establishing the data service connection bearer on the first network for the single-card dual-standby terminal when it is determined that the data service bearing capability of the GPRS of the first network can bear the data service connection request.

7. The method according to claim 6, wherein the first network is a global system for mobile communications (GSM) network and the second network is a time division-synchronous code division multiple access (TD-SCDMA) network.

8. The method according to claim 5, wherein determining whether the data service bearing capability of the GPRS of the first network can bear the data service connection request comprises:
- determining whether a type of a data service connection requested by the data service connection request can be supported by the GPRS of the first network; and
- determining whether a load situation of the GPRS of the first network can support the data service connection request.

9. A packet switch core network, comprising:
- a non-transitory computer-readable medium having instructions stored thereon; and
- a computer hardware processor coupled to the non-transitory computer-readable medium and configured to execute the instructions to:
  - receive a data service connection request that is initiated by a single-card dual-standby terminal through a first network;
  - determine whether a data service bearing capability of the general packet radio service (GPRS) of the first network can bear the data service connection request;
  - process the data service connection request according to the determining result;
  - instruct the single-card dual-standby terminal to enable a second network and establish the data service connection bearer on the second network when it is determined that the data service bearing capability of the GPRS of the first network cannot bear the data service connection request; and
  - switch the data service connection bearer from the second network back to the first network when a message is received indicating that the data service bearing capability of the GPRS of the first network can bear the data service connection request.

10. The packet switch core network according to claim 9, wherein the first network is a global system for mobile communications (GSM) network and the second network is a time division-synchronous code division multiple access (TD-SCDMA) network.

* * * * *